No. 811,606. PATENTED FEB. 6, 1906.
W. H. WILLIAMS.
COMBINED LISTER PLOW AND PLANTER.
APPLICATION FILED FEB. 8, 1905.
5 SHEETS—SHEET 3.
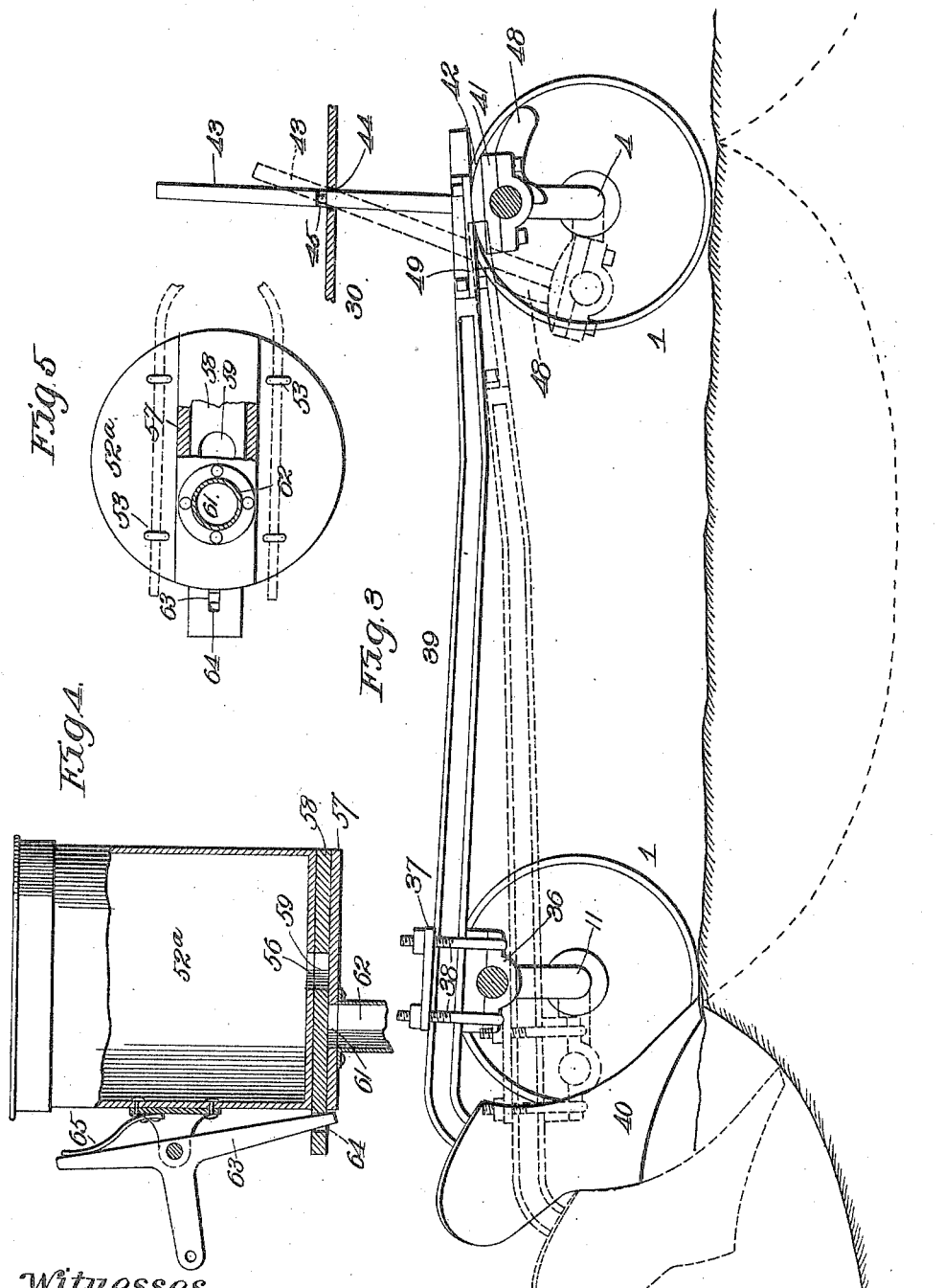
Witnesses
Frank R. Glore.
H. C. Rodgers.
Inventor:
W. H. Williams,
By George H. Thorp
atty.

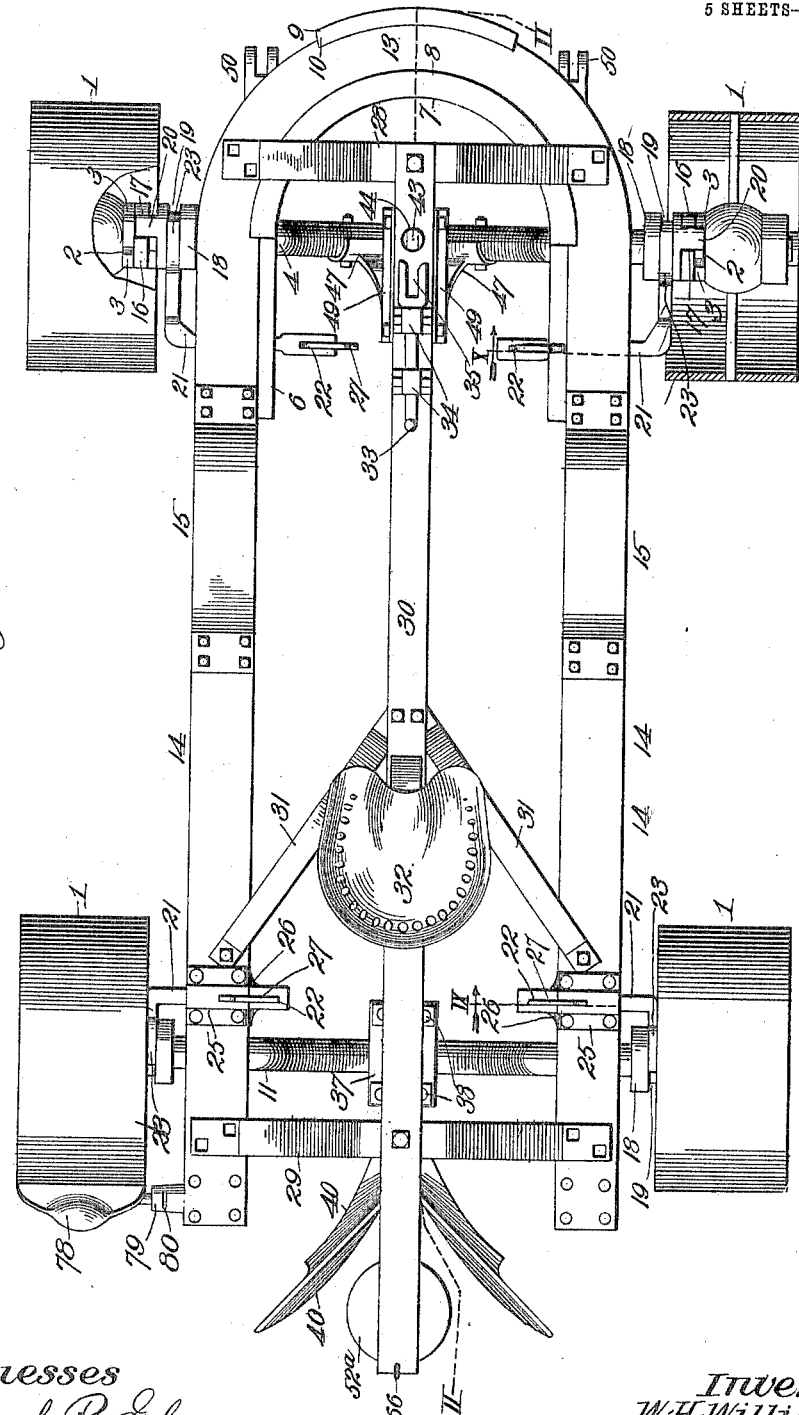

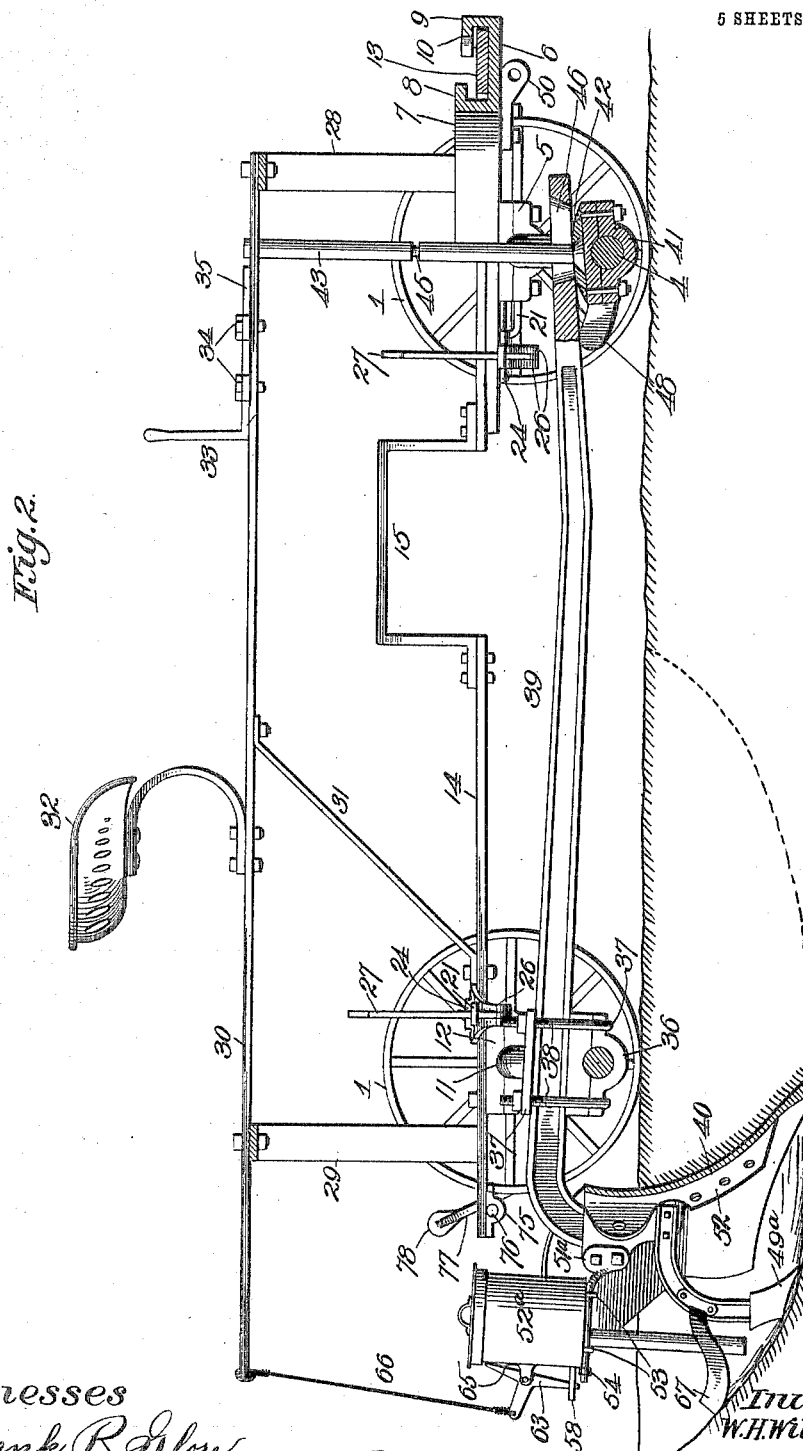

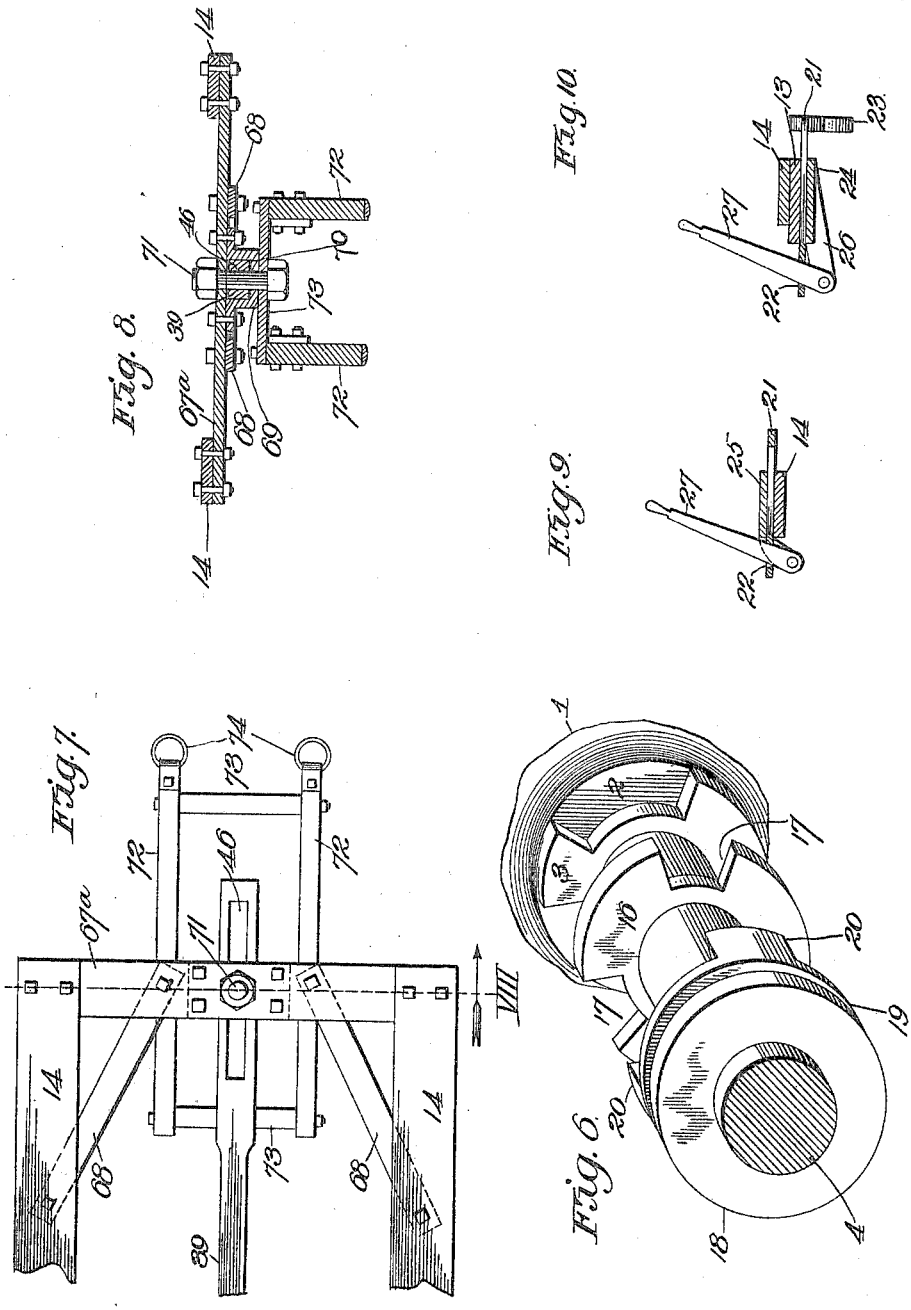

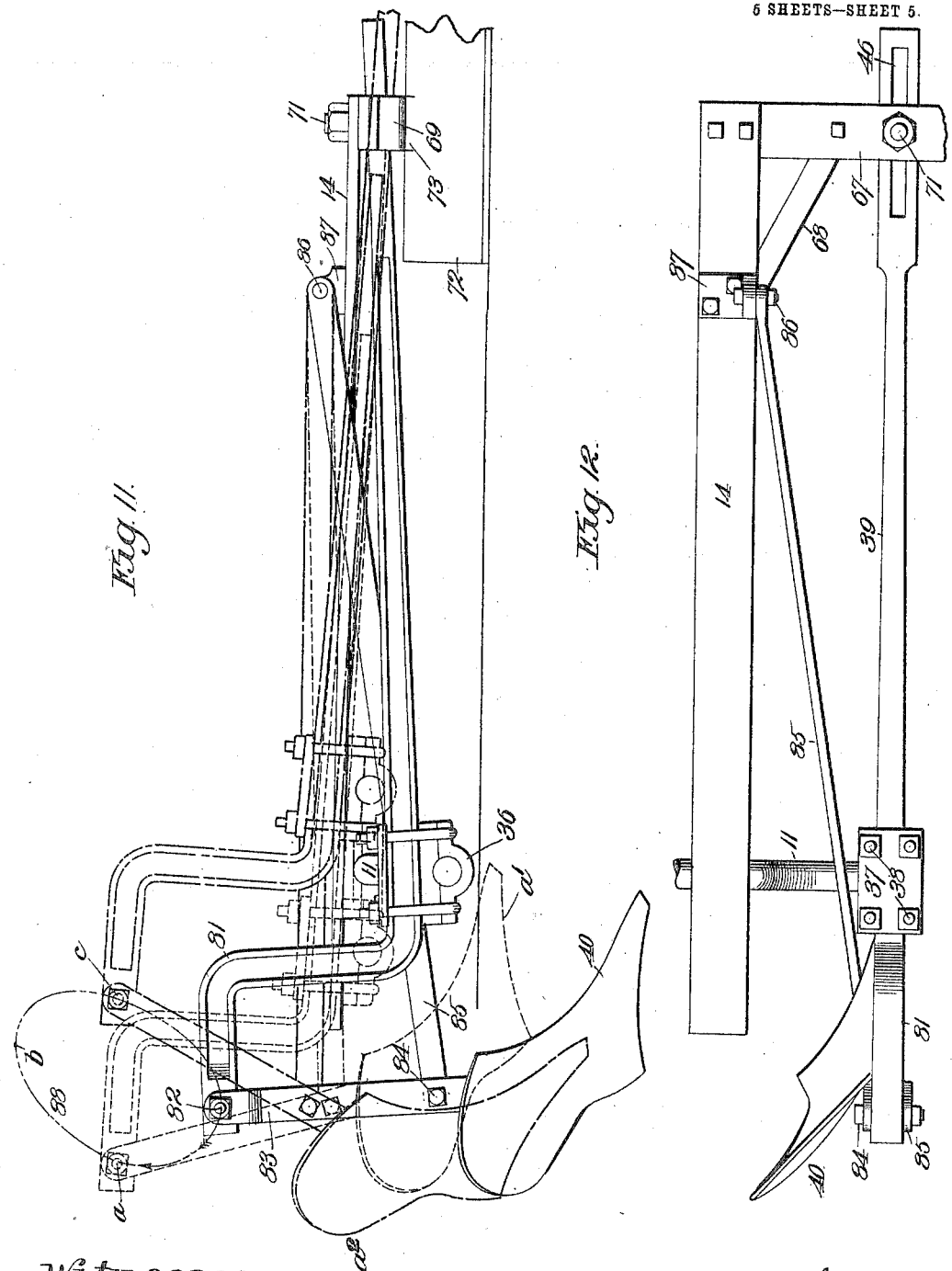

UNITED STATES PATENT OFFICE.

WILLIAM H. WILLIAMS, OF BELLE, OKLAHOMA TERRITORY.

COMBINED LISTER-PLOW AND PLANTER.

No. 811,606.      Specification of Letters Patent.      Patented Feb. 6, 1906.

Application filed February 8, 1905. Serial No. 244,799.

*To all whom it may concern:*

Be it known that I, WILLIAM H. WILLIAMS, a citizen of the United States, residing at Belle, in the county of Custer and Territory of Oklahoma, have invented certain new and useful Improvements in Combined Lister-Plows and Planters, of which the following is a specification.

This invention relates to combined lister-plows and planters; and my object is to produce a plow of this character which will automatically turn a longitudinally-alined series of short furrows and plant the seed therein. This method of plowing and planting on rolling ground and where the rich soil of the latter only extends downward a few inches from the surface is a desideratum in that pockets are formed to collect the water, and therefore insure the moistening of the soil to a relatively great depth at the point where it is most needed and because most of the soil moved by the water will be washed into said pockets, and therefore retained. In certain parts where the rich soil is shallow, the country rolling, and the rainfall at certain periods exceedingly heavy the farmers have had the surface soil washed into and run down the furrows to the bottoms from the hillside land, the course of the water being so unobstructed by reason of the unbroken furrows that the ground would be moistened for a depth of only two or three inches, even where the conditions were otherwise favorable. By making short independent furrows for each deposit of seed it is possible to prevent the earth from washing from the hillsides and insure the penetration of the water to as great a depth as on level ground.

With the object above named in view and others which hereinafter appear the invention consists in certain novel and peculiar features of construction and combinations of parts, as hereinafter described and claimed, and in order that it may be fully understood reference is to be had to the accompanying drawings, in which—

Figure 1 is a top plan view of a combined lister-plow and planter embodying my invention. Fig. 2 is a section taken on the line II II of Fig. 1, the section being taken only through the lower part of the machine. Fig. 3 is a similar section of a part of the machine, showing the plow elevated in full lines and in dotted lines in a position which it assumes in traveling from the position shown in Fig. 2 to the full-line position, Fig. 3. Fig. 4 is a central vertical section of the lower part of the seed-hopper. Fig. 5 is a bottom plan view of the seed-hopper, partly broken away. Fig. 6 is an enlarged perspective view of a part of one of the cranks and wheels of the machine and also shows the clutch mechanism thereof. Fig. 7 is a top plan view of a modified form of construction. Fig. 8 is a section on the dotted line VIII of Fig. 7. Fig. 9 is a vertical section taken on the dotted line IX of Fig. 1. Fig. 10 is a vertical section taken on the dotted line X of Fig. 1. Fig. 11 is a side view showing the sled of Figs. 7 and 8 and the rear crank and a modified construction of the plow-carrying mechanism, said figure also showing a part of the framework and in diagram several different positions which the plow assumes; and Fig. 12 is a top plan view of about half of the machine to show more clearly the relation between the plow and frame.

In the said drawings, 1 indicates the wheels of the machine, having the inner ends of their hubs radially reduced to form notches 2 and shoulders 3. The front wheels are journaled upon a crank-axle 4, journaled in boxings 5, depending rigidly from the horizontal frame 6, this frame being U shape in plan view, with its front or bridge portion semicircular and its arms extending rearwardly parallel with each other a short distance back of the proximate wheels. At the inner side of its semicircular portion the frame is provided with a vertical wall 7, having a flange 8 overlying the body of the frame, and said front portion of the frame is provided at its front edge with a short segmental vertical wall 9, having a rearwardly-projecting flange 10 overlying the body of the frame.

The rear wheels are journaled upon a crank-axle 11, journaled in boxings 12, secured rigidly to an elongated horizontal frame of U shape in plan view. For convenience of construction said frame comprises the U-shaped front portion 13, which fits slidingly or rotatably upon frame 6 and between the walls thereof below flanges 8 and 10, the parallel rear portions 14 and the arches 15 connecting the arms of the front portion 13 and portions 14. This construction reliably connects the front and rear wheels and also permits the former in turning to swing almost at right angles to the latter, as the front wheels are free to pass under the arches 15. The U-shaped portions of said frames constitute the fifth-wheel of the vehicle.

16 indicates collars rigidly secured upon the crank-axles at the inner sides of the hubs, and said collars are provided with peripheral notches 17, adapted to register with but shorter than notches 2 of the hubs, and in this connection attention is called to Fig. 6, which shows the notched collar some distance from the hub, but simply for the purpose of making the drawings clear. In practice said collars will be almost in frictional contact with the hub.

18 indicates clutch members provided with annular grooves 19 and with tongues 20, corresponding in number to notches 17, and adapted at times to project through said notches and into notches 2, so as to lock the wheels and rigid collars rigidly together.

21 indicates transversely-arranged slide-bars provided with longitudinal slots 22 at their inner ends and forked arms 23, engaging the peripheral grooves of clutch-member collars 18. The slide-bars 21 for the front wheels are mounted in keepers 24, secured to the under side of frame 6, while the slide-bars for the rear wheels are mounted in keepers 25, secured to the upper side of the rear-wheel frame, the keepers being substantially duplicates of each other except that they are relatively inverted. Each keeper is provided with the downward and inward extending parallel lugs 26, and pivoted thereon are levers 27, which project upwardly through slots 22 of the slide-bars, the arrangement being such that when the levers are thrown inward they move the clutch-collars 18 in the same direction and throw the wheels out of gear with the crank-axles. When the levers are thrown outward, the clutch members are caused to interlock with the clutch-faces of the hubs, and therefore compel the crank-axles to turn with the wheels.

28 and 29 indicate front and rear arches secured, respectively, to portions 13 and 14 of the horizontal frame extending from one set of the wheels to the other, and 30 a longitudinal bar bolted upon and centrally of said arches, said bar being also braced, as shown at 31 or in any other suitable or preferred manner.

32 is a seat supported from and above bar 30, and 33 is a slide-bar mounted in keepers 34 upon bar 30, the front end of the slide-bar being forked or slotted, as at 35, for a purpose which hereinafter appears.

36 indicates a boxing journaled upon the central portion of the crank of the rear axle, and clamped rigidly to and between said boxing and the plate 37 by means of U-shape bolts or clips 38, is the longitudinally-extending beam 39 of a lister or double-moldboard plow 40, the beam of said plow extending forwardly and overlying the front axle and the boxing 41, journaled thereon, said boxing 41 having a rounded upper surface 42, upon which the beam rests at times, and projecting upwardly from said boxing and slidingly through an opening 44 of bar 30 is a rod 43. Said rod is provided with annular groove 45, adapted at times to appear above bar 30, when it may be engaged by the forked end of the slide-bar 33, this relation of parts locking the crank-axles against rotative movement, as hereinafter more particularly referred to, and in this connection it should be stated that the rod 43 also extends vertically through a longitudinal slot 46 in the front end of the beam, this longitudinal slot being necessary to provide for lost motion due to the fact that the beam must change its angle at times with relation to the ground for the purpose of pointing the plow downward to insure its proper embedment in the ground and upward to insure its proper egress therefrom, as will hereinafter appear.

Rigidly secured to the front crank-axle are castings 47, having curved arms 48, which project in advance of the crank—that is, forward, with relation to the movement of the crank when operated by the wheels. These arms 48 are disposed apart a distance slightly exceeding the width of the plow-beam, the latter being widened for a suitable distance by means of the angle-plates 49, bolted thereto for engagement by said arms. Referring to Fig. 2, it will be noticed that the cranks both occupy their most depressed positions and that the point of the plow has attained its greatest depth and is about to turn upward because the forwardly-projecting arms 48 are bearing at the under side of the lateral enlargement or angle-plates 49 of the beam. As the machine continues onward the arms 48 obviously raise the front end of the beam higher than the rear end, and this results in raising the point and lowering heel of the plow, so that the same will tend to plow its way out of the ground. An intermediate position of the plow in such raising action is shown by dotted lines in Fig. 3, and in full lines in said figure the plow is shown above the ground with its point depressed and its heel elevated, in which position it is ready to plow its way down into the ground, and in this connection it will be apparent that the last-named position of the plow is brought about because the arms 48 have passed from under the enlargement of the plow-beam, and thereby permit said front end to slide downward upon the convex side of said arms until it again rested upon the boxing, as shown in Fig. 3.

In the practical operation of the machine it is obvious the plow describes a circle whose diameter is equal to the circle described by the crank which supports it, but that while this movement is rearward such movement is relatively so slow that the wheels revolve once around during such embedment. Hence the furrow made by the plow is approximately equal in length to the circumference of the wheels, such furrow being deepest at its middle and sloping gradually upward toward its ends, as indicated in Fig. 2 by full and dotted lines, the latter showing the path of the plow in rising from the position shown in said figure to the full-line position of the plow, Fig. 3.

The depth of the furrow at its middle is approximately equal to the diameter of the circle described by the axis of the crank, so that each following furrow shall begin almost coincidentally with the termination of the preceding one. Of course the parts may be proportioned to vary the proportions of the furrows and to leave more or less solid ground between them, and it is equally obvious that the tilting of the plow-point downward to insure its embedment and upward to cause it to plow its way upward may be increased or diminished by a proper change in the proportion of the parts by which such tilting action is accomplished. By thus tilting the plow it is caused to plow its way both up and down, and hence the draft is as light as possible.

As the machine is drawn across the field by the draft-animals hitched to the tongue (not shown) attached to lugs 50, secured to the oscillatory frame 6, the lateral vibration of the tongue causes first one front wheel and then the other to move in advance of its companion, which action if the wheels had no lost motion would apply a twisting strain on the front axle. To accommodate such movement, and thereby prevent the imposition of such strain, the notches 2 are made longer than the width of the engaging tongues 20, as hereinbefore explained. When the machine is turned, the levers 27 are operated to unlock the wheels entirely, so that the outer ones may travel their greater circle without twisting the axle. The rear wheels also have their notches 2 longer than the width of the engaging tongues for the reason above explained, though because they are less subject to irregularity of movement their notches 2 need not be as long as the notches 2 of the front wheels.

Referring now to the planting mechanism which drops the seed rearward of the subsoiler 49$^a$, carried by the plow, 51$^a$ indicates a two-armed bracket secured rigidly to and projecting rearwardly from the frog 52 of the plow, and 52$^a$ the seedbox, having depending staples 53, slidingly engaging the arms of the bracket to permit said box to be removed when necessary, collars 54 on the ends of said arms holding the box against accidental dislodgment.

The seedbox has a discharge-hole 56 in its bottom incased by a substantially U-shaped frame 57, engaged by slide-plate 58, having a hole 59 adapted at proper intervals to register with hole 56 to receive the charge of seed fed by gravity or otherwise from the seedbox, the frame 57 ,forming a bottom for the slide-plate and having a hole 61, with which registers the upper end of the seed-spout 62, rigidly depending from said bottom plate.

63 indicates a rock-lever pivoted to the seed-box and having its lower end extending through a hole 64 in the rear end of the slide-plate and its upper end engaged by a spring 65, secured to the seedbox and exerting a rearward pressure against the upper end of the lever to hold the slide-plate advanced with its hole 59 registering with the hole 56. The other arm of the angle-lever is connected by a cable 66 to the bar 30, so that as the plow is forced into the ground, and thereby gradually increases the distance between the rock-lever and the point on bar 30 where the cable is attached, the latter will gradually overcome the resistance of the spring 65 and move the slide-plate rearward, the movement being such that hole 59 will register with the seed-spout shortly after the plow starts upward, so as to drop the seed in the deepest part of the furrow. It will be obvious that the use of two cables attached to the lever-arm at their lower ends and at different points on the bar 30 at their upper ends will result in dropping the seed twice for each furrow, one cable being slack as the other is drawn taut by the varying positions of the plow.

The seed is covered by the usual coverers 67, supported from the furrow-opener stem.

Referring to Fig. 7, which illustrates a modified type of construction of the front end of the machine, 67$^a$ indicates a cross-bar connecting the front ends of bars 14 in lieu of the semicircular portion 13 and arches 15, and said bars are braced by braces 68.

69 is a U-shaped clip bolted to and depending from bar 67$^a$ midway its length, so as to provide a slot or opening 70 to receive loosely the front end of plow-beam 39, this looseness being necessary in order to permit the front end of said beam to reciprocate and at the same time have a limited amount of pivotal movement in a vertical plane, so as to accommodate the movements of the beam induced by the crank 11, carrying the same, and 71 is a king-bolt extending through bar 67$^a$, slot 46 of the beam, and the lower portion of the clip.

A sled for the support of the front end of the machine in lieu of the construction previously described, if desired, consists of a pair of runners 72, connected by cross-bars 73, one of which is pivotally mounted on the king-bolt, so that the sled may turn upon the latter, the front end of the sled having rings 74 or equivalent devices, to which the team is adapted to be hitched.

For each wheel a scraper mechanism is provided, (see Figs. 1 and 2,) only one such mechanism appearing, because they are of duplicate construction. Said scrapers are each constructed as follows: 75 is a bearing secured to the frame contiguous to the rear portion of the adjacent wheel, and journaled in said bearing is a rod 76, having a scraper-blade 77 at its outer end, the upper end of the blade being weighted, as at 78, so as to hold its lower end yieldingly against the wheel, and thereby in a position to keep the periphery of the wheel comparatively clean, while the machine is in operation. The bearing is provided with a transverse slot 79, (see Fig. 1,) engaged by a short pin 80, projecting from the rod 76, the arrangement being such that when the pin engages the rear end of the slot the scraper is arranged to remove earth from the wheel. When the pin is engaged with the opposite end of the slot, its weighted upper end holds the lower portion of the blade away from the wheel, as will be readily understood.

Referring now to the type of construction illustrated in Figs. 11 and 12, which is really the preferred type of construction as regards the rear end of the machine, it will be noticed that the plow-beam rearward of the boxing 36 is bent to inverted-L form, as at 81, and at its rear end is pivoted, as at 82, to the upper end of an arm 83, projecting upward from and carried rigidly by the plow, this arm being pivotally connected, as at 84, to the rear end of a pair of forwardly-diverging braces 85, the front ends of said braces being pivoted, as at 86, to bearing-brackets 87, secured to the framework 14. When the rear crank depends vertically, the plow occupies the position shown in full lines, Fig. 11. As the crank revolves in the direction indicated by the arrow, Fig. 11, it causes the pivotal point 82 to follow an elliptical path, as shown at 88. As this movement takes place the braces 85 swing the plow upward, and therefore nearer the axis of the shaft, the point of the plow being gradually raised at the same time until the pivotal point 82 reaches the position shown at $a$, Fig. 11, when the plow has attained the position shown by dotted lines $a'$, from which position the oscillation or tilting action of the plow begins to reverse, so that the heel moves upward faster than the point of the plow as it continues to rise. When point 82 has attained the position shown by $b$, the plow has emerged completely from the ground and is occupying a substantially horizontal position—that is, the same position it occupies in full lines, but elevated slightly above the ground. As the pivotal point 82 moves from point $b$ to point $c$ it gradually depresses the point of the plow until the latter occupies a position shown in dotted lines $a^2$, Fig. 11, from which point the depression of the heel becomes more rapid than that of the point, so that when point 82 reaches its original position, as shown in full lines, the plow will again be in the position shown by full lines. During this raising and lowering and tilting and reverse tilting of the plow the movement of the machine of course causes the plow to produce a furrow of substantially the form and proportion shown partly in full and partly in dotted lines, Fig. 2; but it will be noticed that with this type of construction there is no lost motion of the plow and that it plows upward or downward when being moved in said directions with the least possible friction, because it is pointed downward until it attains its greatest depth of penetration and upward until it emerges from the ground.

From the above description it will be apparent that I have produced a combined lister-plow and planter embodying the features of advantage enumerated as desirable.

Having thus described the invention, what I claim as new, and desire to secure by Letters Patent, is—

1. In an agricultural machine, a carrying-frame, a crank-axle mounted thereon, a lister-plow journaled upon said crank-axle, and means to revolve said axle and cause the plow to make a furrow which tapers toward its ends.

2. In an agricultural machine, a carrying-frame, a crank-axle mounted thereon, a lister-plow journaled upon said crank-axle, and means for causing the movement of the machine to simultaneously revolve the plow.

3. In an agricultural machine, the combination of a carrying-frame, wheels supporting the rear end of the same, a crank-axle for said wheels, means to revolve the axle, a plow journaled on the crank of said axle, and means to tilt the plow up and down alternately as the plow respectively rises and descends with the crank.

4. In an agricultural machine, a suitable frame, a support for the front end of the frame, which is capable of turning, wheels supporting the rear end of the frame, a crank-axle for said wheels, a boxing on said crank-axle, a plow secured to the boxing and having the front end of its beam longitudinally slotted, and a rod or bolt extending through said slot.

5. In an agricultural machine, a semicircular frame, a crank-axle journaled therein, wheels journaled upon the ends of the crank-axle, clutch mechanism to lock said wheels rigid with the crank-axle, a frame engaging the semicircular frame and having a relative rotatable movement thereon to permit the front wheels to turn, a crank-axle journaled on the second frame, wheels journaled on said axle, clutch mechanism to throw said wheels in rigid relation with said axle, boxings journaled on said crank-axles, and a plow having its beam rigidly secured to the rear boxing and adapted to rest upon the front boxing.

6. In an agricultural machine a semicircular frame, a crank-axle journaled therein, wheels journaled upon the ends of the crank-axle, clutch mechanism to lock said wheels rigid with the crank-axle, a frame engaging the semicircular frame and having a relative rotatable movement thereon to permit the front wheels to turn, a crank-axle journaled on the second frame, wheels journaled on said axle, clutch mechanism to throw said wheels in rigid relation with said axle, boxings journaled on said crank-axles, a plow having its beam rigidly secured to the rear boxing and adapted to rest upon the front boxing and having its front end slotted, a rod or bolt projecting from the front boxing up through said slot, a guide for the upper end of said rod, and arms projecting forwardly from the front crank to raise the front end of the beam more rapidly than the rear end is raised and thus tilt the plow-point upwardly.

7. In an agricultural machine a semicircular frame, a crank-axle journaled therein, wheels journaled upon the ends of the crank-axle, clutch mechanism to lock said wheels rigid with the crank-axle, a frame engaging the semicircular frame and having a relative rotatable movement thereon to permit the front wheels to turn, a crank-axle journaled on the second frame, wheels journaled on said axle, clutch mechanism to throw said wheels in rigid relation with said axle, boxings journaled on said crank-axles, a plow having its beam rigidly secured to the rear boxing and adapted to rest upon the front boxing and having its front end slotted, a rod or bolt projecting from the front boxing up through said slot, a guide for the upper end of said rod, arms projecting forwardly from the front crank to raise the front end of the beam more rapidly than the rear end is raised and thus tilt the plow-point upwardly, and means for locking the crank-axles at their highest point of movement.

8. In an agricultural machine, a carrying-frame, a crank-axle mounted thereon, a lister-plow journaled upon said crank-axle, means to revolve said axle and cause the plow to make a substantially segmental furrow in the ground, a seedbox movable with the plow and adapted to discharge seed rearward thereof, and means for effecting the discharge of the seed in each revolution of the plow.

9. In an agricultural machine, a carrying-frame a crank-axle mounted thereon, a lister-plow journaled upon said crank-axle, means to revolve said axle and cause the plow to make a substantially segmental furrow in the ground, a seedbox movable with the plow and adapted to discharge seed rearward thereof, means for effecting the discharge of the seed in each revolution of the plow, and coverers also movable with the plow to cover the seed dropped by the seedbox.

10. In an agricultural machine, a carrying-frame, a crank-axle mounted thereon, means for revolving the crank-axle, a plow-beam pivoted on said crank, a plow pivotally suspended from said beam, and a pivoted brace connecting the plow structure and framework.

11. In an agricultural machine, a carrying-frame, a crank-axle mounted thereon, a plow-beam pivoted on said crank, a plow pivotally suspended from said beam, and a pair of forwardly-diverging braces pivoted at their rear ends to the plow structure and at their front ends to the carrying-frame.

12. In an agricultural machine, a suitable frame, a support for the front end of the frame, which is capable of turning, wheels supporting the rear end of the frame, a revoluble crank-axle for the wheels, a plow-beam pendently supported from the crank-axle and having a longitudinally-slidable connection at its front end with the support for the front end of the frame, and a plow secured rigidly to the rear portion of the beam.

In testimony whereof I affix my signature in the presence of two witnesses.

WILLIAM H. WILLIAMS.

Witnesses:
  H. C. RODGERS,
  G. Y. THORPE.